(12) United States Patent
Schaefer et al.

(10) Patent No.: US 12,265,240 B2
(45) Date of Patent: Apr. 1, 2025

(54) MIRROR AND MIRROR SUBSTRATE WITH HIGH ASPECT RATIO, AND METHOD AND MEANS FOR PRODUCING SUCH A MIRROR SUBSTRATE

(71) Applicant: SCHOTT AG, Mainz (DE)

(72) Inventors: Martin Schaefer, Mainz-Kostheim (DE); Marco Weisenburger, Undenheim (DE); Volker Seibert, Hochheim (DE); Thomas Westerhoff, Mainz (DE)

(73) Assignee: SCHOTT AG, Mainz (DE)

( * ) Notice: Subject to any disclaimer, the term of this patent is extended or adjusted under 35 U.S.C. 154(b) by 828 days.

(21) Appl. No.: 16/535,401

(22) Filed: Aug. 8, 2019

(65) Prior Publication Data

US 2020/0049868 A1  Feb. 13, 2020

(30) Foreign Application Priority Data

Aug. 8, 2018  (DE) ...................... 10 2018 119 337.8

(51) Int. Cl.
*G02B 5/10* (2006.01)
*C03B 19/02* (2006.01)
(Continued)

(52) U.S. Cl.
CPC ............... *G02B 5/10* (2013.01); *C03B 19/02* (2013.01); *C03C 10/0027* (2013.01); *G02B 7/183* (2013.01)

(58) Field of Classification Search
CPC .. G02B 5/10; G02B 7/182; G02B 5/08; C03C 10/0027; C03B 19/00
(Continued)

(56) References Cited

U.S. PATENT DOCUMENTS 3,453,041 A    7/1969  Räntsch
4,124,277 A *  11/1978  Stang ................ B32B 17/10174
                                                 65/106
(Continued)

FOREIGN PATENT DOCUMENTS

CN        106094079        11/2016
CN        107500774        12/2017
(Continued)

OTHER PUBLICATIONS

ISO 7991:1987, "Glass—Determination of coefficient of mean linear thermal expansion", First Edition, Dec. 15, 1987, 12 pages.

*Primary Examiner* — Ricky D Shafer
(74) *Attorney, Agent, or Firm* — Ruggiero McAllister & McMahon LLC

(57) ABSTRACT

A mirror, a mirror substrate, a method for producing are provided. The mirror substrate is made of a material having a coefficient of mean linear thermal expansion of less than or equal to $1*10^{-6}$/K. The mirror substrate includes at least one feature selected from a group consisting of: a ratio of a lateral dimension to a maximum thickness of at least 100, a ratio of the lateral dimension to the maximum thickness of at least 150, a ratio of the lateral dimension to the maximum thickness of at least 200, a ratio of the lateral dimension to the maximum thickness of at least 300, a weight per unit area of 100 kg/m² or less, a weight per unit area of 50 kg/m² or less, a weight per unit area of 30 kg/m² or less, a weight per unit area of 15 kg/m² or less, a mirror surface with a roughness ($R_a$) of at most 3.5 μm, and a mirror surface with a roughness ($R_a$) of less than 1.2 μm.

24 Claims, 3 Drawing Sheets

(51) Int. Cl.
 *C03C 10/00* (2006.01)
 *G02B 7/183* (2021.01)
(58) Field of Classification Search
 USPC .................. 359/838, 868, 869, 871, 883
 See application file for complete search history.

(56) References Cited

U.S. PATENT DOCUMENTS

| | | | | |
|---|---|---|---|---|
| 4,777,371 | A * | 10/1988 | Baute | G03F 1/60 |
| | | | | 347/121 |
| 4,856,019 | A * | 8/1989 | Miyata | G02B 5/0858 |
| | | | | 359/585 |
| 5,148,324 | A * | 9/1992 | Van Amstel | G02B 7/182 |
| | | | | 359/846 |
| 5,208,704 | A | 5/1993 | Zito | |
| 5,565,052 | A | 10/1996 | Papenburg | |
| 5,646,792 | A * | 7/1997 | Butler | B32B 7/06 |
| | | | | 126/684 |
| 6,142,642 | A * | 11/2000 | Krisko | C03C 17/3649 |
| | | | | 359/884 |
| 6,176,588 | B1 | 1/2001 | Davis, Jr. | G02B 7/182 |
| | | | | 359/848 |
| 10,422,933 | B2 * | 9/2019 | Mooney | G02B 5/0816 |
| 10,634,911 | B2 * | 4/2020 | Sato | G02B 27/01 |
| 2002/0154280 | A1 * | 10/2002 | Bernas | B33Y 10/00 |
| | | | | 355/51 |
| 2003/0129414 | A1 * | 7/2003 | Ota | C03C 10/0036 |
| | | | | 428/426 |
| 2004/0107731 | A1 | 6/2004 | Doehring | |
| 2005/0099813 | A1 * | 5/2005 | Hashizume | G02B 5/282 |
| | | | | 362/261 |
| 2005/0185145 | A1 * | 8/2005 | Halsberghe | H04N 9/28 |
| | | | | 353/33 |
| 2007/0177274 | A1 * | 8/2007 | Masaki | B82Y 10/00 |
| | | | | 359/584 |
| 2008/0099935 | A1 | 5/2008 | Egle | |
| 2017/0022091 | A1 * | 1/2017 | Gehindy | B23Q 3/02 |
| 2017/0075045 | A1 * | 3/2017 | Medwick | G02B 5/10 |
| 2018/0003867 | A1 * | 1/2018 | Mooney | G02B 7/183 |
| 2021/0231912 | A1 * | 7/2021 | Kinast | G02B 7/182 |

FOREIGN PATENT DOCUMENTS

| | | |
|---|---|---|
| DE | 102014216456 | 7/2015 |
| DE | 102015112036 | 1/2017 |
| EP | 1391433 | 2/2004 |
| JP | 08-68897 * | 3/1996 |
| JP | 08068897 * | 3/1996 |
| JP | H09309064 | 12/1997 |
| WO | 2011002068 | 1/2011 |
| WO | 2013014182 | 1/2013 |

* cited by examiner

MIRROR AND MIRROR SUBSTRATE WITH HIGH ASPECT RATIO, AND METHOD AND MEANS FOR PRODUCING SUCH A MIRROR SUBSTRATE

CROSS REFERENCE TO RELATED APPLICATIONS

This application claims benefit under 35 USC § 119(a) of German Application 10 2018 119 337.8 filed Aug. 8, 2018, the entire contents of which are incorporated herein by reference.

BACKGROUND

1. Field of the Invention

The invention generally relates to a mirror and a mirror substrate, in particular a mirror and a mirror substrate having a high aspect ratio, and to a method and means for producing same.

2. Description of Related Art

Mirror substrates are used, for example, in so-called reflecting telescopes, also known as reflectors, or in other precision optics, and there they serve as a substrate for the application of a highly reflective mirror layer.

For a consistently high quality of the mirror, in particular with regard to long term stability, the properties of the mirror substrate play an important role:

Weight of the mirror substrate. If the mirror substrate has an excessively high weight, for example because it is a mirror with a particularly large diameter, deformation may occur under the intrinsic weight of the mirror substrate, which will degrade the quality of the optical image. However, low weight is generally beneficial even for smaller mirror substrates, because of improved handleability.

Surface quality of the mirror substrate. A high surface quality of the mirror substrate is required in order to allow for a high-quality reflective layer to be deposited. Particularly important is the roughness of the mirror surface of the mirror substrate, on which the highly reflective layer is deposited.

Further properties. The mirror substrate should furthermore essentially be made of a material of high resistance, in particular high thermal resistance, and which has a low coefficient of thermal expansion. Suitable materials include in particular glasses, ceramics and glass ceramics. Known are, for example, lithium aluminum silicate glass ceramics, such as those marketed under the trademarks ZERODUR® or Clearceram®, or cordierite-based materials, or glasses with very low coefficients of thermal expansion, such as synthetic fused silica doped with $TiO_2$, for example the glass marketed under the trademark ULE®, or ceramics comprising cordierite or SiC or consisting of cordierite or SiC.

Usually, mirror substrates, for example those made of glass ceramics, are manufactured by first providing a melt and then casting the material, so that initially a glassy material is provided. In order to avoid cracks in the material and to produce a glass ceramic from the glassy starting material, complex temperature control is required, in particular slow and controlled cooling. In the manufacture of synthetic fused silica, too, so-called ingots or rather larger sheets are first produced by deposition of $SiO_2$. If necessary, the diameter of sheets can be increased by lowering processes.

Subsequently, mechanical reworking is performed in order to obtain a workpiece with the desired dimensions and in the desired quality. Mechanical reworking may in particular include drilling, grinding and polishing.

It has been known to use supports for such reworking steps that are arranged under the workpiece or the mirror substrate, respectively. With the use of such supports it is intended to prevent damage to the mirror substrate.

In particular, it has been known that workpieces having a high aspect ratio, for example mirror substrates having a high aspect ratio, should preferably be supported over the entire surface of the workpiece during mechanical reworking, but also during other reworking steps such as coating, or when being transported. Such full-surface support of the workpiece in particular aims to keep the workpiece, i.e. for example a mirror substrate, dimensionally stable so that it does not deform, for example under the influence of gravity.

For example, German patent application DE 10 2015 112 036 A1 discloses a mineral-based casting support for full-surface support of a workpiece for workpieces having a high aspect ratio.

However, it has been found by the present disclosure that problems arise with such a mineral-based casting support if extensive polishing processes are necessary to achieve a surface of special quality. In this case, a large amount of heat is generated. However, this is unfavorable with respect to the different thermal expansion between the supported workpiece made of a low-expansion material and the mineral-based casting support, so that it is impossible to achieve the required accuracy in terms of geometrical dimensions of the mirror substrate and the surface quality thereof.

European patent application EP 1 391 433 A2 discloses a support made of a keatite glass ceramic, which may be used for shaping glass or glass ceramics, for example. However, keatite glass ceramics also have a higher coefficient of thermal expansion compared to the usual low-expansion materials that are used for mirror substrates. So, it is not possible either in this way to produce mirror substrates with the required accuracies in terms of geometric dimensions and surface quality.

These problems in particular arise when novel mirror substrates are addressed, which have a particularly small thickness and large diameter at the same time. Currently, such mirror substrates cannot be produced, or not with a sufficient quality in terms of form stability and surface quality, or they even break during processing.

There is thus a need for mirror substrates and mirrors having a high aspect ratio with a small absolute thickness and at the same time high surface quality and dimensional accuracy and stability. Furthermore, there is a need for supports that can be used to make high aspect ratio mirror substrates and mirrors, and for a method for producing such mirror substrates and mirrors.

SUMMARY

The object of the invention is to provide mirror substrates which overcome or at least mitigate the known deficiencies of the prior art, and to provide mirrors, in particular on the basis of such mirror substrates. There is also a need for a method and for means for producing such mirror substrates and mirrors based thereon.

A mirror substrate according to the present invention comprises a material having a coefficient of mean linear thermal expansion of less than or equal to $1*10^{-6}/K$, preferably less than or equal to $0.1*10^{-6}/K$, and most preferably less than or equal to $0.05*10^{-6}/K$. According to particularly advantageous embodiments, the mirror substrate may even have a coefficient of mean linear thermal expansion of less than or equal to $0.02*10^{-6}/K$ or even less than or equal to $0.01*10^{-6}/K$.

This mirror substrate has at least one of the following features: the mirror substrate has a ratio of its lateral dimension to its maximum thickness of at least 100, preferably of at least 150, more preferably of at least 200, and most preferably of 300 or more; and the weight per unit area of the mirror substrate is 100 kg/m² or less, preferably 50 kg/m² or less, more preferably 30 kg/m², and most preferably 15 kg/m² or less.

The mirror substrate has a mirror surface that has a roughness $R_a$ of at most 3.5 µm, ideally less than 1.2 µm, and the mirror surface of the mirror substrate preferably has a ground finish.

According to one embodiment of the invention, the mirror substrate has a maximum thickness of 50 mm or less, especially 20 mm or less, preferably 15 mm or less, more preferably 10 mm or less, and most preferably 2 mm or less.

Preferably, the mirror substrate has a lateral dimension of at least 200 mm and/or at most 4500 mm. However, the invention is equally applicable to mirror substrate having smaller or larger lateral dimensions.

According to a further embodiment of the invention, the mirror substrate may be polished on a support, so that the mirror substrate will then have a polished mirror surface with a root mean square (RMS) roughness of less than 2 nm, preferably less than 1 nm.

Yet another aspect of the invention relates to a method for producing a mirror substrate, in particular a mirror substrate according to any of the preceding embodiments. The method comprises the steps of: providing a support for supporting a mirror substrate bearing thereon preferably over the entire surface thereof; providing a mirror substrate made of a material that has a coefficient of thermal expansion of less than or equal to $1*10^{-6}/K$, preferably of less than or equal to $0.1*10^{-6}/K$, and most preferably of less than or equal to $0.05*10^{-6}/K$; placing the mirror substrate onto the support; mechanically reworking, in particular polishing, drilling, grinding, or lapping, a surface of the mirror substrate, in particular the mirror surface thereof; wherein the coefficients of thermal expansion of the material the support is made of and of the material the mirror substrate is made of differ by no more than an absolute value of $1*10^{-6}/K$, preferably by no more than an absolute value of $0.1*10^{-6}/K$, more preferably by no more than an absolute value of $0.05*10^{-6}/K$, and most preferably by no more than an absolute value of $0.02*10^{-6}/K$.

According to specific embodiments of the method it is even possible that the material the mirror substrate is made of has a coefficient of thermal expansion of less than or equal to $0.02*10^{-6}/K$ or even less than or equal to $0.01*10^{-6}/K$.

The functional surface of the mirror substrate is arranged opposite the surface bearing on the support. In a preferred embodiment, in order to provide for safe processing and/or safe transport of the mirror substrate, the mirror substrate is fixed to the support at least against lateral displacement relative to the support. Preferably, the mirror substrate is also secured or fixed against liftoff or detachment from the support. The fixing may in particular be accomplished by clamps, adhesively, or by a negative pressure between the support and the mirror substrate.

Another aspect of the invention relates to the use of a mirror substrate according to embodiments of the invention in astronomical applications or in lithographic processes, for example in LCD lithography and/or in microlithography.

BRIEF DESCRIPTION OF THE DRAWINGS

The invention will now explained in more detail with reference to figures, wherein.

DETAILED DESCRIPTION

Figure 1:
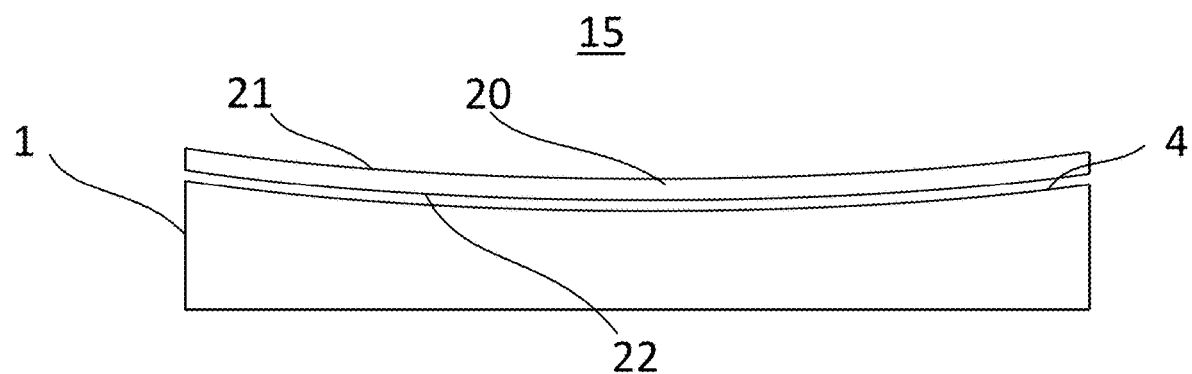
FIGS. 1 and 2 show an assembly comprising a mirror substrate and a support according to embodiments of the invention.

The following definitions and terminology shall apply in the context of the present application.

A mirror substrate material having a low coefficient of thermal expansion refers to a material exhibiting a coefficient of mean linear thermal expansion of less than or equal to $3*10^{-6}/K$.

The ratio of lateral dimension of the mirror substrate to the maximum thickness thereof is also referred to as the aspect ratio. Accordingly, the aspect ratio is a dimensionless parameter. Usually, a mirror substrate has a circular or approximately circular shape, so that the lateral dimension usually is the diameter of the mirror substrate. If the mirror substrate features different lateral dimensions, for example if the mirror substrate has a width differing from the length thereof, the mean value is calculated and used for the calculation of the aspect ratio.

The thickness of the mirror substrate may vary over the extent of the mirror substrate. For example, mirror substrates may have a smaller thickness at the outer edges than in the center thereof. To determine the aspect ratio, the maximum thickness is used.

The high aspect ratio usually implies a low weight per unit area. In one embodiment of the invention, this weight per unit area is 100 kg/m² or less, preferably 50 kg/m² or less, and most preferably 30 kg/m² or less.

In the present application, unless explicitly stated otherwise, the coefficient of mean thermal expansion $\alpha$ is given for the range from 0 to 50° C., however, the invention also relates to materials featuring low thermal expansion with an expansion coefficient that was measured in a different temperature range. The value is the nominal coefficient of mean linear thermal expansion in compliance with ISO 7991, which is determined by static measurement. In the context of the present invention, the terms expansion coefficient, coefficient of thermal expansion, coefficient of mean linear thermal expansion, and $\alpha$ are used interchangeably, unless expressly stated otherwise.

In the present invention, a mirror substrate is understood to mean the substrate onto which a highly reflective layer (or mirror layer) is applied. The term mirror substrate also encompasses a workpiece which is to be processed or is being processed into a mirror substrate, that is, for example, a semifinished product of a mirror substrate, which, although having already been cut to the dimensions of the finished mirror substrate, still has to be subjected to further reworking steps.

In the context of the present invention, mirror refers to the composite of a mirror substrate with a highly reflective layer on the functional surface thereof. The surface of the mirror substrate onto which the reflective layer is applied is referred to as the functional surface of the mirror substrate in the present disclosure. The highly reflective layer is also referred to as a mirror layer in the context of the present invention.

Support is understood to mean a device that serves for supporting purposes during storage, during transport, and/or during reworking of a workpiece that is bearing thereon, such as a mirror substrate.

If, in the context of the present invention, an article is described as comprising a specific material, this in particular also encompasses the case where the article is predominantly made of this material, that is to say by more than 50 wt %, or where it is even substantially made of this material, that is to say by more than 90 wt %. Furthermore, this may also encompass the case where the article consists of this material, i.e. is entirely made of this material.

In the context of the present invention, mirror surface of the mirror substrate refers to that surface of the mirror substrate onto which the mirror layer is to be applied or has been applied. So, this is a quality face of the mirror substrate, i.e. a surface on which particular requirements are imposed in terms of surface quality.

So, the mirror substrate comprises a material having a low coefficient of mean linear thermal expansion. In particular, the mirror substrate may consist predominantly, that is to say by more than 50 wt %, or even substantially, that is to say by more than 90 wt %, or even completely of such a material or a mixture of such materials. Materials having such a low coefficient of thermal expansion in particular include glasses, glass ceramics, and ceramics, for example lithium aluminum silicate glass ceramics such as those marketed under the trademarks ZERODUR®, Astrosital®, or Clearceram®, for example, or cordierite-based materials, or glasses with very low coefficients of thermal expansion such as synthetic fused silica doped with $TiO_2$, for example as marketed under the trademark ULE®, or ceramics comprising cordierite or SiC or made of cordierite or SiC.

It has not been possible so far to provide a mirror substrate according to the present invention, i.e. which comprises a material having a low coefficient of thermal expansion and with an aspect ratio of at least 100, preferably of at least 150, and more preferably of at least 200, and most preferably 300 or more; and/or a weight per unit area of the mirror substrate of 100 kg/m² or less, preferably 50 kg/m² or less, and more preferably 30 kg/m² or less; wherein the mirror substrate has a mirror surface with a roughness $R_a$ of at most 3.5 μm, better less than 1.2 μm.

In particular, this has hitherto not been possible for a maximum thickness of the mirror substrate of 20 mm or less, preferably 15 mm or less, more preferably 10 mm or less, and most preferably 2 mm or less.

This was in particular true for mirror substrates having a lateral dimension of at least 200 mm. For mirror substrates having a lateral dimension of 1000 mm or more, maximum thicknesses of 50 mm or less, especially 40 mm or less or more preferably 30 could not be realized.

Namely, because of the large aspect ratio and the small absolute thickness, it was not possible to process the surface of the mirror substrate so as to achieve a low roughness $R_a$ of not more than 3.5 μm or even not more than 1.2 μm. It was in particular not possible to obtain such a roughness in a grinding process. Rather, in the processing of such a mirror substrate, the mirror substrate broke during reworking before such a low roughness was achieved.

According to one embodiment, the mirror surface as illustrated has a roughness $R_a$ of not more than 3.5 μm, preferably not more than 1.2 μm, and the functional surface of the mirror substrate preferably has a ground finish.

This has not been feasible so far either.

Difficulties in the manufacture of such mirror substrates included, in particular, that a reworking process such as grinding, lapping, or polishing, which is used to achieve the low roughness considered here releases a large amount of thermal energy. So, in other words, both the mirror substrate and the support used in the reworking process will heat up. This heating is substantial to such an extent that in the processes required here thermo-mechanical stresses may arise between the support and the mirror substrate bearing thereon, and this will especially happen if the support has a high coefficient of thermal expansion.

According to a further embodiment of the invention, the mirror substrate comprises a glass ceramic, preferably a lithium aluminum silicate glass ceramic, the lithium aluminum silicate glass ceramic preferably being in the form of a high-quartz solid solution glass ceramic, or a Ti-doped synthetic silica glass, and/or a ceramic, preferably a ceramic comprising cordierite and/or SiC.

The mirror substrate may in particular consist predominantly, that is to say by more than 50 percent by weight, or substantially, that is to say by more than 90 percent by weight, or even completely of such a material.

Such materials typically not only exhibit low coefficients of thermal expansion but usually also good reworkability, such as good sandability and polishability.

According to a further aspect, the invention also relates to a mirror, in particular a mirror comprising a mirror substrate according to embodiments of the present invention. The mirror comprises a highly reflective layer on the mirror surface of the mirror substrate.

Another aspect of the present invention relates to a support for supporting, preferably over the full surface thereof, a mirror substrate bearing thereon, in particular a mirror substrate according to embodiments of the invention, during processing and/or transport thereof. The support comprises a material having a coefficient of mean linear thermal expansion of less than or equal to $1*10^{-6}$/K, preferably of less than or equal to $0.1*10^{-6}$/K, and most preferably of less than or equal to $0.05*10^{-6}$/K. According to specific embodiments, the expansion coefficient of the support may even be less than or equal to $0.02*10^{-6}$/K, or even less than or equal to $0.01*10^{-6}$/K.

In particular, the support may consist predominantly, that is to say by more than 50 wt %, or even substantially, that is to say by more than 90 wt %, or even completely of this material or of a mixture of such materials. The support preferably has a lateral dimension of generally at least 200 mm and at most 4500 mm.

Thus, the support is suitable for processing and/or transporting mirror substrates that have a large lateral dimension. At the same time, the material of the support having a coefficient of mean linear thermal expansion of less than or equal to $1*10^{-6}$/K, preferably less than or equal to $0.1*10^{-6}$/K, and most preferably less than or equal to $0.05*10^{-6}$/K (and according to special embodiments even less than or equal to $0.02*10^{-6}$/K or even less than or equal to $0.01*10^{-6}$/K) ensures that even in case of extensive heat generation during reworking such as grinding, lapping, or polishing, the support will exhibit only low thermal expansion.

Here, surface of the support refers to that surface of the support on which the mirror substrate will bear on at least partially during reworking and/or when being transported.

According to a further embodiment of the support, the surface of the support has a curved shape. Preferably, the surface of the support is approximated by an envelope.

The envelope may be understood here as a predefined shape or geometry of the surface of the support. Thus, the quality of the support is also characterized by any existing deviation between the actual surface of the support and the ideally descriptive envelope. Resulting deviations that are still tolerable between the envelope and the actual surface differ as a function of the diameter of the workpiece or mirror substrate.

Particularly preferably, the deviation of the support from the envelope is not more than 0.5 mm, preferably not more than 0.1 mm, more preferably not more than 0.05 mm, according to some embodiments even not more than 0.025 mm for a mirror substrate having a lateral dimension of at least 4000 mm; and/or is not more than 0.2 mm, preferably not more than 0.05 mm and more preferably not more than 0.025 mm for a mirror substrate having a lateral dimension of at least 2000 mm; and/or is not more than 0.1 mm, preferably not more than 0.05 mm and more preferably not more than 0.01 mm for a mirror substrate having a lateral dimension of at least 1200 mm.

According to a further embodiment of the support, the surface of the support is at least partially covered with an intermediate material. The intermediate material may be a film, according to one embodiment a polymer film. The intermediate material may also comprise pitch, bitumen and/or silicone. Preferably, the intermediate material, for example the film, has a thickness which is at least as great as the deviation of the actual shape of the surface from the envelope. Particularly preferably, the intermediate material, e.g. a film, has a maximum thickness of at most 200 μm, preferably at most 100 μm, more preferably at most 50 μm, or most preferably even only at most 25 μm. A very good adaptation of the shape of the support to the envelope of the mirror substrate is favorable here.

Polymer films may exhibit a non-linear resilient behavior, which may eventually lead to deviations in the shape of the reflection surface of the mirror substrate after grinding. Optionally, this may be improved by using alternative or additional intermediate materials. Such intermediate materials may include metallic foils or pasty or gelatinous materials, as well as curing films.

The intermediate material may serve, inter alia, to cushion any deviations in the surface shape of the support from the ideal predefined surface shape that can be described by an envelope.

However, alternatively or additionally, the intermediate material may also fulfill other functions. For example, the intermediate material can also serve to reduce adhesion between the support and the bearing mirror substrate, so that once the processing or transport of the mirror substrate has been completed, the mirror substrate can be lifted from the support easily and in particular without damage.

If the intermediate material is provided in the form of a polymer film, the polymer may comprise one or more of the group consisting of polyethylene (PE), polypropylene (PP), polystyrene (PS), polycarbonate (PC), one or more polyesters, polyether ketone (PEK), polyethylene terephthalate (PET), polytetrafluoroethylene (PTFE) such as Teflon®, one or more tetrafluoroethylene copolymers (ETFE), polyvinyl chloride (PVC).

Preferably, the intermediate material comprises materials that are designed so as to exhibit heat resistance of 150° C. or more.

According to a further embodiment of the invention, an intermediate material is preferred which has a lowest possible coefficient of thermal expansion for these material classes.

If the intermediate material is in the form of a polymer film, polymers exhibiting heat resistance of 150° C. or more are preferred. Furthermore, in this case, preference is given to those polymers which have a lowest possible coefficient of thermal expansion for polymers.

According to another embodiment of the support, the intermediate material comprises polyvinylchloride (PVC), PTFE, ETFE, PEK, and/or PET. For example, the intermediate material may be in the form of a polymer film comprising PVC, PTFE, ETFE, PEK, and/or PET.

If lower thermal loads occur during the reworking steps, it is also possible to use thermally less stable polymer films, for example films made of polyethylene or polypropylene.

Preference is moreover given to thermoplastic polymer films that tend to yield to a certain degree at the high temperatures that may arise in the mechanical reworking of a mirror substrate. Any deviations in the surface of the support from the envelope can be even better compensated for in this way.

The film may be applied to the surface of the substrate in one piece, as a whole, or in the form of spaced-apart portions, for example in the form of individual smaller pieces.

According to one embodiment, the film includes "channels" extending at least to the edge, so that when the mirror substrate is placed on the support, air can be dissipated to the outside and the mirror substrate will bear on the surface. If the film is applied as a whole, such channels may subsequently be introduced, e.g. cut, into the film.

According to another embodiment of the support, the surface of the support is partially covered with the intermediate material, e.g. the film, so that the intermediate material is applied to the surface in the form of spaced-apart portions. The spaced-apart-portions of the intermediate material may be arranged in a symmetrical pattern. One option for this is a radially symmetrical, for example a four-fold radially symmetrical pattern of the portions of intermediate material, e.g. portions of film.

According to one embodiment, the portions have a circular or elliptical shape.

Such an embodiment of the support allows for a mechanical load occurring during processing or transport of the mirror substrate, for example due to the intrinsic weight of the mirror substrate, to be absorbed particularly uniformly by the entire surface of the support. Mechanical stresses in the mirror substrate can be minimized in this way. Thus, the stability of the mirror substrate on the support during processing is increased.

According to a variation of the invention, the support may be configured such that any residues arising during the reworking of the supported workpiece can be removed cleanly and without damaging the workpiece itself.

For this reason, the support may be configured in such a way that any residues arising during processing of the workpiece can be discharged.

For this purpose, the surface of the support may, for example, be smooth or be provided with grooves.

Figure 3:
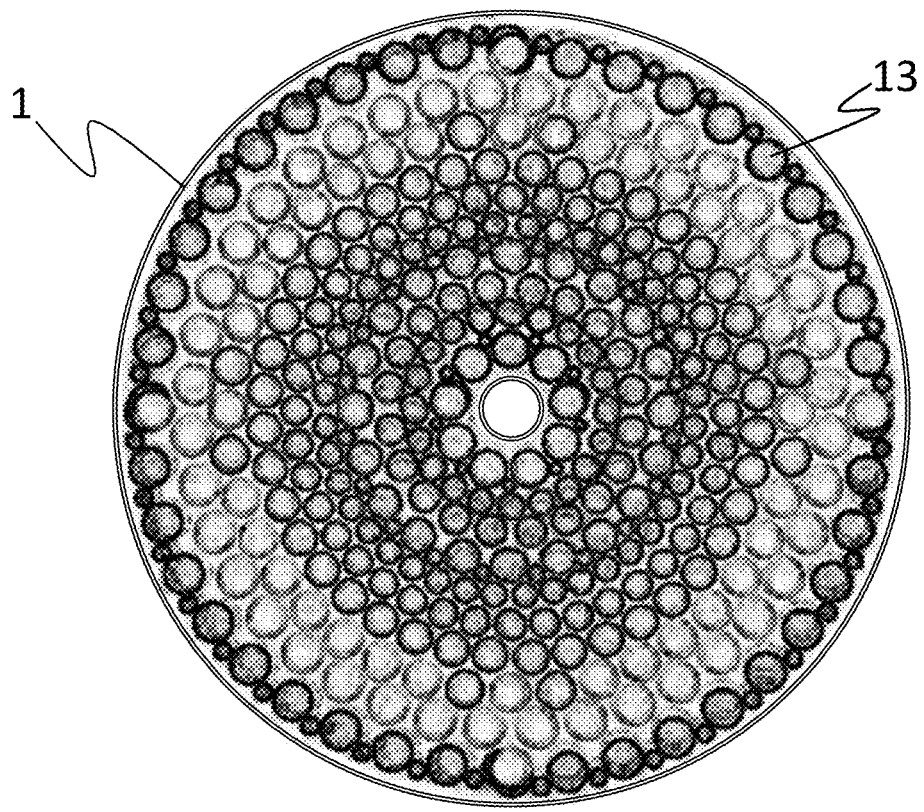
FIG. 3 is a view of a surface of a support according to an embodiment of the invention.

The surface of the support may furthermore comprise at least one opening, for example a drain through which residues arising during the reworking of the workpiece can be discharged. If one or more openings are provided, the intermediate material may even be applied tightly, or continuously so as to present no channels at the outer edge of the mirror substrate, as shown in FIG. 3, since air and residues can be dissipated through openings in the support.

According to one embodiment of the invention, the drain is defined by web-like grooves consisting of radially extending and circular elements.

Another aspect of the present invention relates to an assembly consisting of a support and a mirror substrate.

The support is used for supporting a mirror substrate bearing thereon preferably over the full surface thereof during processing and/or transport thereof, and comprises a material having a coefficient of mean linear thermal expansion of less than or equal to $1*10^{-6}$/K, preferably less than or equal to $0.1*10^{-6}$/K, and most preferably less than or equal to $0.05*10^{-6}$/K, according to special embodiments even of less than or equal to $0.02*10^{-6}$/K or even less than or equal to $0.01*10^{-6}$/K.

The mirror substrate comprises a material having a coefficient of mean linear thermal expansion of less than or equal to $1*10^{-6}$/K, preferably less than or equal to $0.1*10^{-6}$/K, and most preferably less than or equal to $0.05*10^{-6}$/K, according to special embodiments even of less than or equal to $0.02*10^{-6}$/K or even less than or equal to $0.01*10^{-6}$/K.

The mirror substrate preferably has a maximum thickness of 50 mm or less, especially 20 mm or less, preferably 15 mm or less, more preferably 10 mm or less, and most preferably 2 mm or less. The lateral dimension of the mirror substrate is preferably at least 200 mm.

The mirror substrate has one of the following features: the mirror substrate has a ratio of its lateral dimension to its maximum thickness of at least 100, preferably of at least 150, more preferably of at least 200, and most preferably of 300 or more; the weight per unit area of the mirror substrate is 100 kg/m$^2$ or less, preferably 50 kg/m$^2$ or less, more preferably 30 kg/m$^2$ or less, most preferably 15 kg/m$^2$ or less.

According to one embodiment of the assembly, the mirror surface of the mirror substrate has a roughness $R_a$ of at most 3.5 μm, ideally of less than 1.2 μm, and the mirror surface of the mirror substrate preferably has a ground finish.

According to a further embodiment, the surface of the mirror substrate has an RMS roughness of less than 2 nm, preferably of less than 1 nm, and the surface of the mirror substrate preferably has a polished finish.

According to another embodiment of the assembly, the coefficients of thermal expansion of the material the support is made of and of the material the mirror substrate is made of differ by no more than an absolute value of $1*10^{-6}$/K, preferably by no more than an absolute value of $0.1*10^{-6}$/K, more preferably by no more than an absolute value of $0.05*10^{-6}$/K, and most preferably by no more than an absolute value of $0.02*10^{-6}$/K.

Preferably, the surface of the support and the surface of the mirror substrate which is bearing on the surface of the support have opposite complementary curvatures.

In other words, the surface of the support preferably has a convex curvature when the surface of the mirror substrate bearing thereon has a concave curvature, and vice versa. So, the surface of the support and the bearing surface of the mirror substrate have a complementary shape in the superimposed areas.

According to one embodiment of the assembly, the mirror substrate is fixed laterally on the support, and, preferably, the mirror substrate is additionally secured against detachment from the support.

FIG. 1 is a schematic view, not drawn to scale, of an assembly 15 comprising a support 1 and a mirror substrate 20 according to one embodiment. Here, the mirror substrate 20 is designed such that the surface of the element 20 bearing on the support 1, i.e. the bearing surface 22, has a convex curvature. By contrast, the surface 4 of the support 1 has a concave downward curvature, in order to ensure the best possible support of the workpiece or the glass, glass ceramic or ceramic element. Accordingly, the bearing surface 22 and the surface 4 have an opposite complementary shape, in order to achieve a full-surface support of the thin mirror substrate 20.

Figure 2:
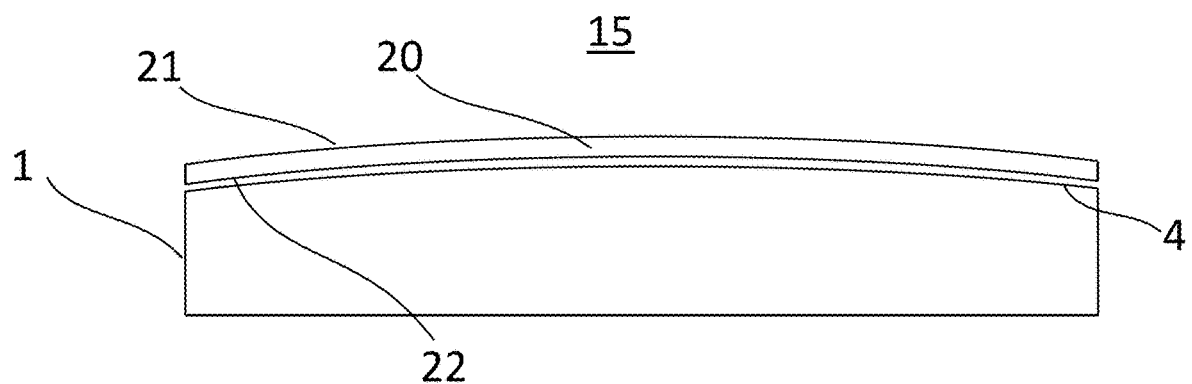

FIG. 2 is a schematic view, not drawn to scale, of a further embodiment of the assembly 15, composed of the support 1 and a mirror substrate 20 bearing thereon, wherein the mirror substrate 20 is designed such that the bearing surface 22 that is bearing on the support 1 has a concave shape. The surface 4 of the support 1, by contrast, has a convex upward curvature, in order to ensure the best possible support for the mirror substrate 20.

Generally, in the assembly 15 as shown schematically and not to scale in FIGS. 1 and 2, the support 1 serves to support a mirror substrate 20 bearing thereon preferably over the full surface thereof during processing and/or transport thereof. The support 1 comprises a material having a coefficient of mean linear thermal expansion of less than or equal to $1*10^{-6}$/K, preferably of less than or equal to $0.1*10^{-6}$/K, and most preferably of less than or equal to $0.05*10^{-6}$/K, or even of less than or equal to $0.02*10^{-6}$/K or even less than or equal to $0.01*10^{-6}$/K. The mirror substrate 20 comprises a material having a coefficient of mean linear thermal expansion of likewise less than or equal to $1*10^{-6}$/K, preferably less than or equal to $0.1*10^{-6}$/K, and most preferably less than or equal to $0.05*10^{-6}$/K, or even of less than or equal to $0.02*10^{-6}$/K or even less than or equal to $0.01*10^{-6}$/K. Preferably, the mirror substrate has a maximum thickness of 50 mm or less, especially 20 mm or less, preferably 15 mm or less, more preferably 10 mm or less, and most preferably 2 mm or less. Furthermore preferably, the lateral dimension of the mirror substrate 20 is at least 200 mm and may in particular be up to 4500 mm. The mirror substrate 20 has one of the following features:

The mirror substrate 20 has a ratio of its lateral dimension to its maximum thickness of at least 100, preferably of at least 150, and more preferably of at least 200, and most preferably of 300 or more; and/or the weight per unit area of the mirror substrate 20 is 100 kg/m$^2$ or less, preferably 50 kg/m$^2$ or less, and more preferably 30 kg/m$^2$. A weight per unit area of 15 kg/m$^2$ or less is particularly preferred.

According to one embodiment of the invention, the mirror surface of the mirror substrate has a roughness $R_a$ of at most 3.5 μm, ideally less than 1.2 μm, wherein the surface of the mirror substrate preferably has a ground finish. If the mirror surface of the mirror substrate has a polished finish, RMS roughness is preferably less than 2 nm, most preferably less than 1 nm.

According to yet another embodiment of the assembly 15, the coefficients of thermal expansion of the material the support 1 is made of and of the material the mirror substrate 20 is made of differ by no more than an absolute value of $1*10^{-6}$/K, preferably by no more than an absolute value of $0.1*10^{-6}$/K, more preferably by no more than an absolute value of $0.05*10^{-6}$/K, and most preferably by no more than an absolute value of $0.02*10^{-6}$/K.

FIG. 3 is a schematic view, not drawn to scale, showing a support 1 according to an embodiment of the invention as used in an assembly according to any one of FIG. 1 or 2, by way of example.

The support 1 for supporting a mirror substrate 20 (not shown) bearing thereon preferably over the entire surface of the mirror substrate during processing and/or transport thereof comprises a material having a coefficient of mean linear thermal expansion of less than or equal to $1*10^{-6}$/K, preferably of less than or equal to $0.1*10^{-6}$/K, and most preferably of less than or equal to $0.05*10^{-6}$/K, and in specific embodiments even of less than or equal to $0.02*10^{-6}$/K or even less than or equal to $0.01*10^{-6}$/K, wherein the support preferably has a lateral dimension of at least 200 mm and/or of at most 4500 mm.

According to one embodiment, the surface 4 of the support 1 has a curved shape, as shown in the drawings, wherein, preferably, the surface 4 of the support 1 is approximated by an envelope; and wherein, most preferably, the deviation of the support 1 from the envelope is not more than 0.5 mm, preferably not more than 0.025 mm for a mirror substrate 20 having a lateral dimension of at least 4000 mm; and/or is not more than 0.2 mm and preferably not more than 0.025 mm preferably for a mirror substrate 20 having a lateral dimension of at least 2000 mm; and/or is not more than 0.1 mm and preferably not more than 0.01 mm preferably for a mirror substrate 20 having a lateral dimension of at least 1200 mm.

According to yet another embodiment of the support 1, the surface 4 of the support 1 is at least partially covered with an intermediate material 13, for example a film 13, in particular with a polymer film, wherein the intermediate material 13, such as the film, preferably has a thickness which is at least as great as the deviation of the actual shape of the surface 4 from the envelope, wherein the intermediate material 13 preferably has a maximum thickness of at most 200 μm, preferably at most 100 μm, more preferably at most 50 μm, or most preferably even not more than 25 μm.

Besides the curved embodiment of the support mentioned above, the support may be flat, according to yet another embodiment, for example for producing plane mirrors.

According to another embodiment of the support, the intermediate material 13 comprises polyvinyl chloride.

Preferably, the surface 4 of the support 1 is only partially covered with the intermediate material 13. For example, a film may be applied to the surface as shown here, in FIG. 3, as an intermediate material 13 in the form of small pieces, which may in particular be arranged in a regular pattern, for example a symmetrical or radially symmetrical pattern. In one embodiment, a three-, four- or multi-fold symmetry of the film pieces is suggested, and the film pieces preferably have a circular or elliptical shape.

FIGS. 4a-4d illustrates method steps for producing a mirror substrate 20.

Figure 4A:
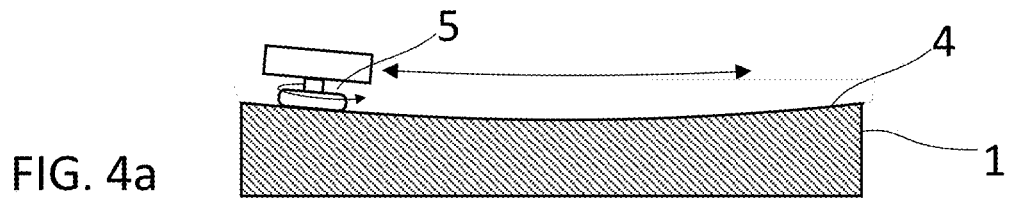
FIGS. 4a-4d illustrate process steps for producing the mirror substrate.
Figure 4B:
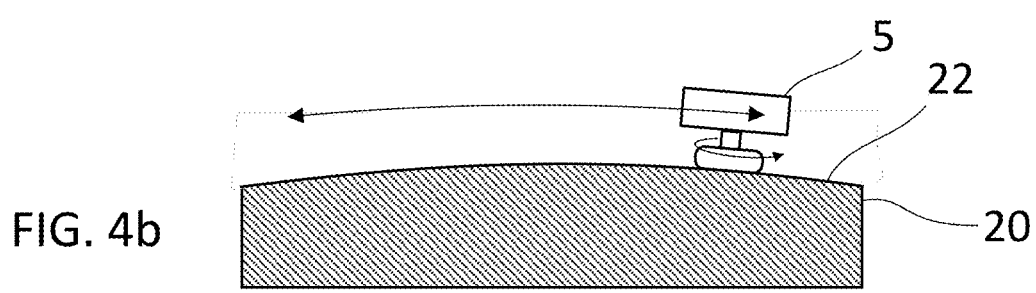
Figure 4C:
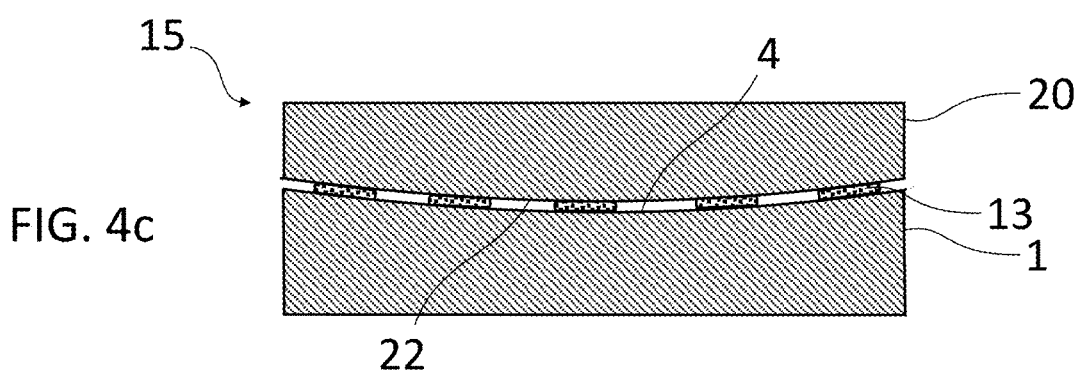
Figure 4D:
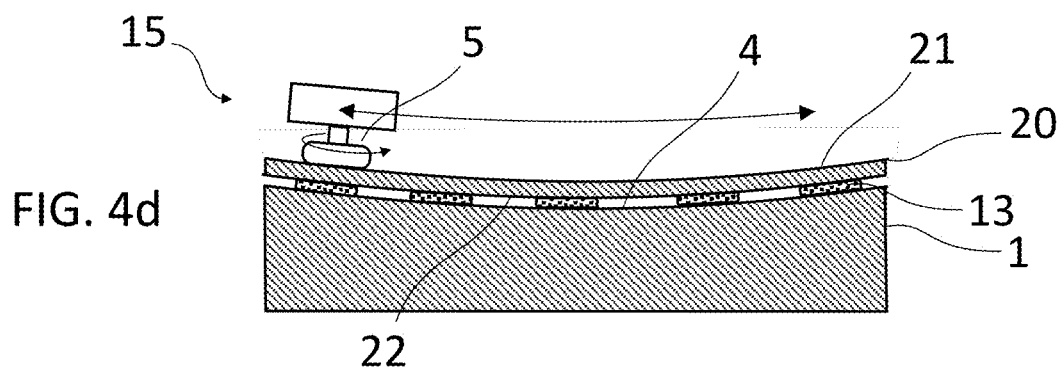

First, the mirror substrate and the support are prepared. As shown in FIG. 4a, the surface 4 of the support 1 is shaped in accordance with a predefined envelope which is concave here, for example, using a grinding tool 5 such as a rotating grinding disk. FIG. 4b shows the corresponding processing of the bearing surface 22 of the mirror substrate 20. Here, the bearing surface 22 is provided with a curvature complementary to that of surface 4. Once the surfaces 4, 22 have been shaped in this manner, the mirror substrate 20 is placed on the support 1 and is fixed, as shown in FIG. 4c. In this case, an intermediate material 13 may again be used to compensate for remaining inequalities in the surfaces, and optionally also to provide shock absorption during the further processing of the mirror substrate 20. The fixing against lateral displacement of the mirror substrate 20 on the support and also against detachment may be achieved adhesively, by the intermediate material 13, for example. In the so obtained assembly 15, the functional surface 21 can then be worked out with a grinding tool 5, as shown in FIG. 4d, with little deformation of the mirror substrate 20. The support 1 can further be used for processing further mirror substrates, so that when a series of a plurality of identical mirror substrates 20 is produced, the step according to FIG. 4a has to be performed only once.

Without being limited to the illustrated example, the method for producing a mirror substrate 20 according to a preferred embodiment of the invention as described above is based on the shaping of a surface 4 of the support 1 and of a bearing surface according to a predefined shape or according to a predefined surface profile by material-removing machining, and the bearing surface 22 of the mirror substrate and the surface 4 of the support 1 are formed with opposite complementary shapes, at least in bearing areas, and the bearing surface 22 of the mirror substrate 20 and the surface 4 of the support 1 are brought together and the mirror substrate 20 is fixed to the support 1 so that an assembly 15 is formed, and then, in the assembly 15, the functional surface 21 opposite the bearing surface 22 is formed by material-removing machining.

It will be apparent to those skilled in the art that the invention is not limited to the illustrated embodiments, but may rather be varied in many ways. For example, the order of processing of the surfaces 4 and 22 is not important, they may as well be shaped simultaneously, for example, or the bearing surface 22 of the mirror substrate 20 is shaped first, contrary to what the sequence of FIGS. 4a-4d show.

LIST OF REFERENCE NUMERALS

1 Support
5 Grinding tool
13 Intermediate material
15 Assembly
20 Mirror substrate
21 Functional surface of 20
22 Bearing surface of 20
4 Surface of support

What is claimed is:

1. A mirror substrate comprising:
    a material having a coefficient of mean linear thermal expansion of less than or equal to $1*10^{-6}$/K;
    at least one feature selected from a group consisting of: a ratio of a lateral dimension to a maximum thickness of at least 100, a ratio of the lateral dimension to the maximum thickness of at least 150, a ratio of the lateral dimension to the maximum thickness of at least 200, and a ratio of the lateral dimension to the maximum thickness of at least 300; and
    a mirror surface opposite a support surface,
    wherein the support surface is configured so that the mirror substrate can be lifted from a mirror support without damage,
    wherein the support surface is a surface on which the mirror substrate is bearing during processing, transport, or both processing and transport,
    wherein the support surface has a curved shape and is an envelope having a deviation of the support surface from the envelope that is not more than 0.5 mm when the mirror substrate has a lateral dimension of at least 4000 mm.

2. The mirror substrate of claim 1, wherein the coefficient of mean linear thermal expansion of the material is less than or equal to $0.05*10^{-6}$/K.

3. The mirror substrate of claim 1, wherein the maximum thickness is 50 mm or less.

4. The mirror substrate of claim 1, wherein the maximum thickness is 2 mm or less.

5. The mirror substrate of claim 1, wherein the lateral dimension is at least 200 mm and/or at most 4500 mm.

6. The mirror substrate of claim 1, wherein the mirror surface has a roughness (RMS) of less than 2 nm.

7. The mirror substrate of claim 1, wherein the mirror surface has a polished finish.

8. The mirror substrate of claim 1, wherein the material is selected from a group consisting of a glass ceramic, a lithium aluminum silicate glass ceramic, a high-quartz solid solution lithium aluminum silicate glass ceramic, a Ti-doped synthetic silica glass, a ceramic, a cordierite ceramic, and an SiC ceramic.

9. A mirror comprising the mirror substrate of claim 1, wherein the mirror surface has a highly reflective layer on the mirror surface.

10. A mirror support for supporting the mirror substrate of claim 1 during the processing, the transport, or both the processing and transport, the support comprising a material having a coefficient of mean linear thermal expansion of less than or equal to $1*10^{-6}$/K.

11. The mirror support of claim 10, wherein the coefficient of mean linear thermal expansion of the material of the mirror support is less than or equal to $0.05*10^{-6}$/K.

12. The mirror support of claim 10, wherein the surface of the mirror support is at least partially covered with an intermediate material having a thickness that is at least as great as the deviation.

13. The mirror support of claim 12, wherein the intermediate material comprises polyvinylchloride.

14. The mirror support of claim 10, wherein the surface of the mirror support is partially covered with an intermediate material so that the intermediate material is applied on the surface in the form of spaced-apart portions so as to define a radially symmetrical pattern of the spaced-apart portions of the intermediate material.

15. An assembly comprising the mirror support and mirror substrate of claim 10.

16. The assembly of claim 15, wherein the mirror support and the mirror substrate have coefficients of thermal expansion that differ by no more than an absolute value of $1*10^{-6}$/K.

17. The assembly of claim 15, wherein the surface of the mirror support and the surface of the mirror substrate which is bearing on the surface of the mirror support have opposite complementary curvatures.

18. The mirror substrate of claim 1, wherein the mirror substrate further comprises a mirror surface that has a roughness ($R_a$) of at most 3.5 µm or of less than 1.2 µm.

19. A method for producing the mirror substrate of claim 1, comprising the steps of:
providing the mirror support;
providing the mirror substrate;
placing a bearing surface of the mirror substrate onto the support surface of the mirror support; and
mechanically reworking the mirror surface of the mirror substrate.

20. The method of claim 19, wherein the mirror support and mirror substrate have coefficients of thermal expansion that differ by no more than an absolute value of $0.02*10^{-6}$/K.

21. The method of claim 20, wherein the step of mechanically reworking comprises a process selected from a group consisting of polishing, drilling, grinding, and lapping.

22. The method of claim 19, further comprising:
shaping the support surface of the mirror support and the bearing surface of the mirror substrate by material-removing machining to surface profiles having opposite complementary shapes; and
securing the bearing surface and the support surface to yield an assembly.

23. A support for supporting a mirror substrate during processing, transport, or both processing and transport, the mirror substrate having a material having a coefficient of mean linear thermal expansion of less than or equal to $1*10^{-6}$/K and at least one feature selected from a group consisting of: a ratio of a lateral dimension to a maximum thickness of at least 100, a ratio of the lateral dimension to the maximum thickness of at least 150, a ratio of the lateral dimension to the maximum thickness of at least 200, a ratio of the lateral dimension to the maximum thickness of at least 300, a weight per unit area of 100 kg/m² or less, a weight per unit area of 50 kg/m² or less, a weight per unit area of 30 kg/m² or less, a weight per unit area of 15 kg/m² or less, a mirror surface with a roughness ($R_a$) of at most 3.5 µm, and a mirror surface with a roughness ($R_a$) of less than 1.2 µm, the support comprising:
a material having a coefficient of mean linear thermal expansion of less than or equal to $1*10^{-6}$/K,
wherein the support has a surface on which the mirror substrate is bearing, the surface having a curved shape and being an envelope having a deviation of the support from the envelope that is not more than 0.5 mm when the mirror substrate has a lateral dimension of at least 4000 mm.

24. An assembly comprising:
a mirror substrate that has a material having a coefficient of mean linear thermal expansion of less than or equal to $1*10^{-6}$/K and at least one feature selected from a group consisting of: a ratio of a lateral dimension to a maximum thickness of at least 100, a ratio of the lateral dimension to the maximum thickness of at least 150, a ratio of the lateral dimension to the maximum thickness of at least 200, a ratio of the lateral dimension to the maximum thickness of at least 300, a weight per unit area of 100 kg/m² or less, a weight per unit area of 50 kg/m² or less, a weight per unit area of 30 kg/m² or less, a weight per unit area of 15 kg/m² or less, a mirror surface with a roughness ($R_a$) of at most 3.5 µm, and a mirror surface with a roughness ($R_a$) of less than 1.2 µm; and
a support that supports the mirror substrate during processing, transport, or both processing and transport and comprises a material having a coefficient of mean linear thermal expansion of less than or equal to $1*10^{-6}$/K,
wherein a surface of the support and a surface of the mirror substrate which is bearing on the surface of the support have opposite complementary curvatures,
wherein the support has a surface on which the mirror substrate is bearing, the surface having a curved shape and being an envelope having a deviation of the support from the envelope that is not more than 0.5 mm when the mirror substrate has a lateral dimension of at least 4000 mm.

* * * * *